(12) United States Patent
Benisty

(10) Patent No.: US 12,670,119 B2
(45) Date of Patent: Jun. 30, 2026

(54) ADAPTIVE REPLAY OF PACKETS IN A PERIPHERAL INTERFACE LINK

(71) Applicant: Sandisk Technologies, Inc., Milpitas, CA (US)

(72) Inventor: Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/949,022

(22) Filed: Nov. 15, 2024

(65) Prior Publication Data

US 2026/0140912 A1 May 21, 2026

(51) Int. Cl.
*G06F 13/42* (2006.01)

(52) U.S. Cl.
CPC .. *G06F 13/4282* (2013.01); *G06F 2213/0026* (2013.01)

(58) Field of Classification Search
CPC .............................. G06F 21/606; H04L 43/062
See application file for complete search history.

(56) References Cited

U.S. PATENT DOCUMENTS

| | | | |
|---|---|---|---|
| 11,088,782 B2 | 8/2021 | Carlough | |
| 11,770,215 B2 | 9/2023 | Eberle | |
| 2007/0112994 A1 | 5/2007 | Sandven et al. | |
| 2009/0086735 A1 | 4/2009 | Tsang | |
| 2013/0128721 A1 | 5/2013 | DeCusatis et al. | |
| 2021/0374079 A1* | 12/2021 | Shin | G06F 13/382 |
| 2022/0014520 A1* | 1/2022 | Bhargav-Spantzel | H04L 43/062 |
| 2022/0206445 A1* | 6/2022 | Reichl | H04L 12/66 |
| 2022/0303137 A1* | 9/2022 | Brogle | G06F 21/606 |
| 2023/0148195 A1* | 5/2023 | Hur | G06F 3/0607 711/102 |

FOREIGN PATENT DOCUMENTS

| | | |
|---|---|---|
| JP | 2016530764 A | 9/2016 |
| JP | 2024526012 A | 7/2024 |
| WO | 2024091740 A1 | 5/2024 |

\* cited by examiner

*Primary Examiner* — Getente A Yimer
(74) *Attorney, Agent, or Firm* — Patent Law Works LLP

(57) ABSTRACT

Systems, methods, and circuits for adaptive replay of data link packets in a peripheral interface are described. The data link layer according to a peripheral interface protocol may include a replay buffer memory to support both sequential and selective replay in response to packet errors. Responsive to detecting a packet in error, the receiver may determine an adaptive threshold for selecting a replay mode based on a set of link operating parameters and then select between selective and sequential replay modes by comparing the fill level of the replay buffer to the adaptive threshold determined for that packet error.

20 Claims, 7 Drawing Sheets

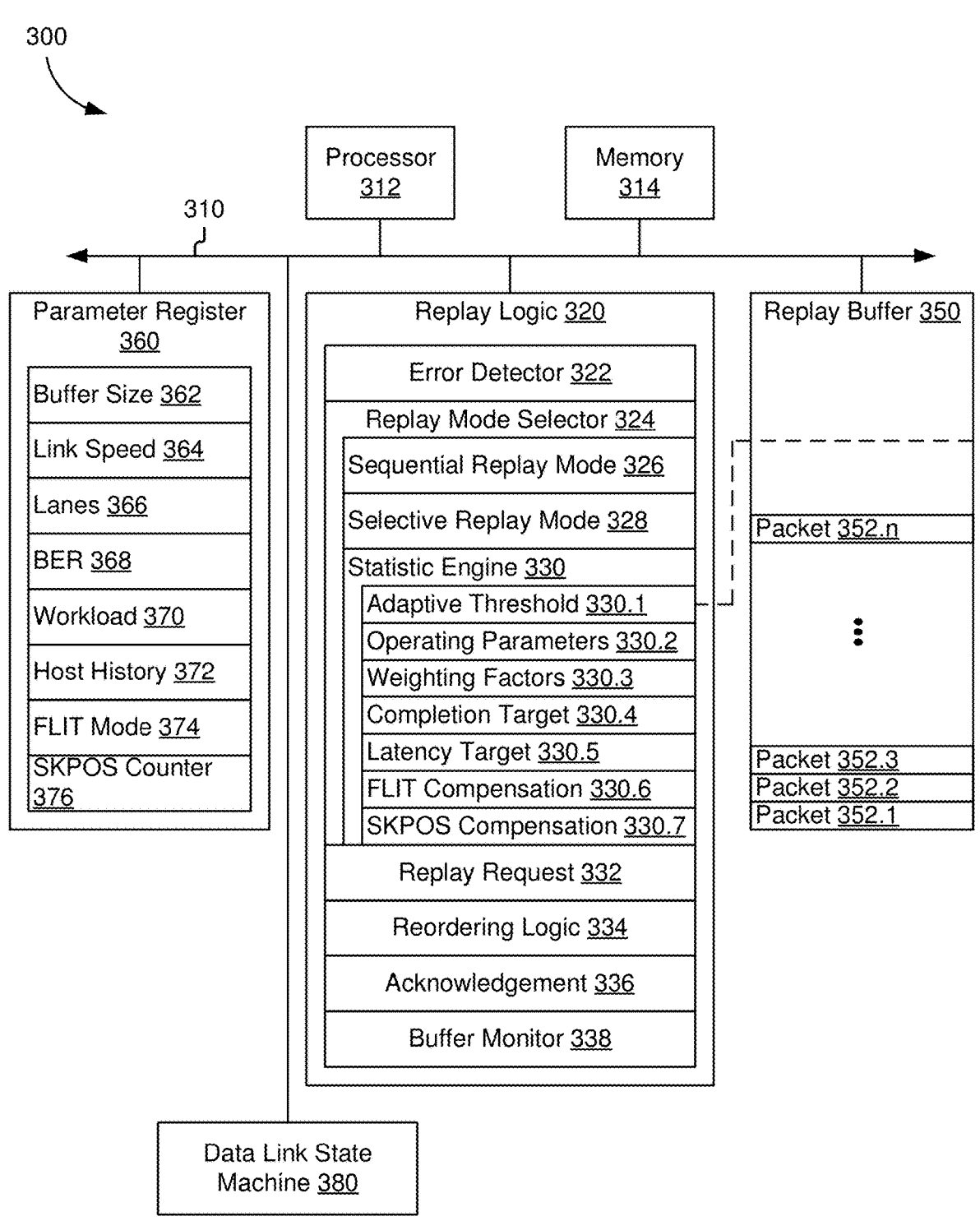

300

310

Processor
312

Memory
314

Parameter Register
360

Buffer Size 362

Link Speed 364

Lanes 366

BER 368

Workload 370

Host History 372

FLIT Mode 374

SKPOS Counter 376

Replay Logic 320

Error Detector 322

Replay Mode Selector 324

Sequential Replay Mode 326

Selective Replay Mode 328

Statistic Engine 330

Adaptive Threshold 330.1

Operating Parameters 330.2

Weighting Factors 330.3

Completion Target 330.4

Latency Target 330.5

FLIT Compensation 330.6

SKPOS Compensation 330.7

Replay Request 332

Reordering Logic 334

Acknowledgement 336

Buffer Monitor 338

Replay Buffer 350

Packet 352.n

Packet 352.3
Packet 352.2
Packet 352.1

Data Link State
Machine 380

Send Packets to Receiver
510

Receive Replay Request
512

Determine Packet in Error
514

Determine Replay Mode
516

518

Selective Replay?

Yes          No

Interrupt Packet Sequence
520

Terminate Packet Sequence
530

Resend Packet in Error Out of
Sequence 522

Resend Packet in Error
532

Resume Packet Sequence from
Interrupt 524

Resume Packet Sequence from
Packet in Error 534

600

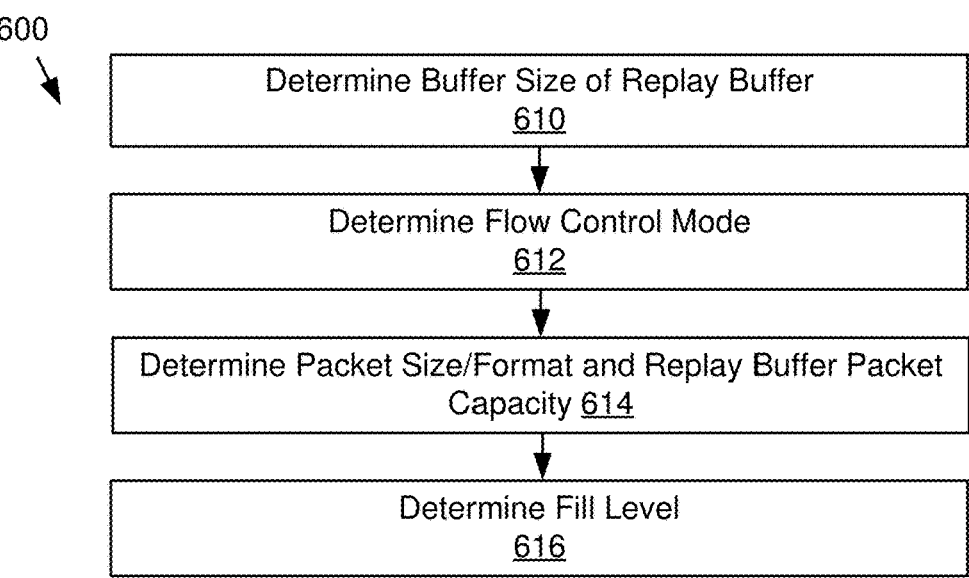

Determine Buffer Size of Replay Buffer
610

Determine Flow Control Mode
612

Determine Packet Size/Format and Replay Buffer Packet
Capacity 614

Determine Fill Level
616

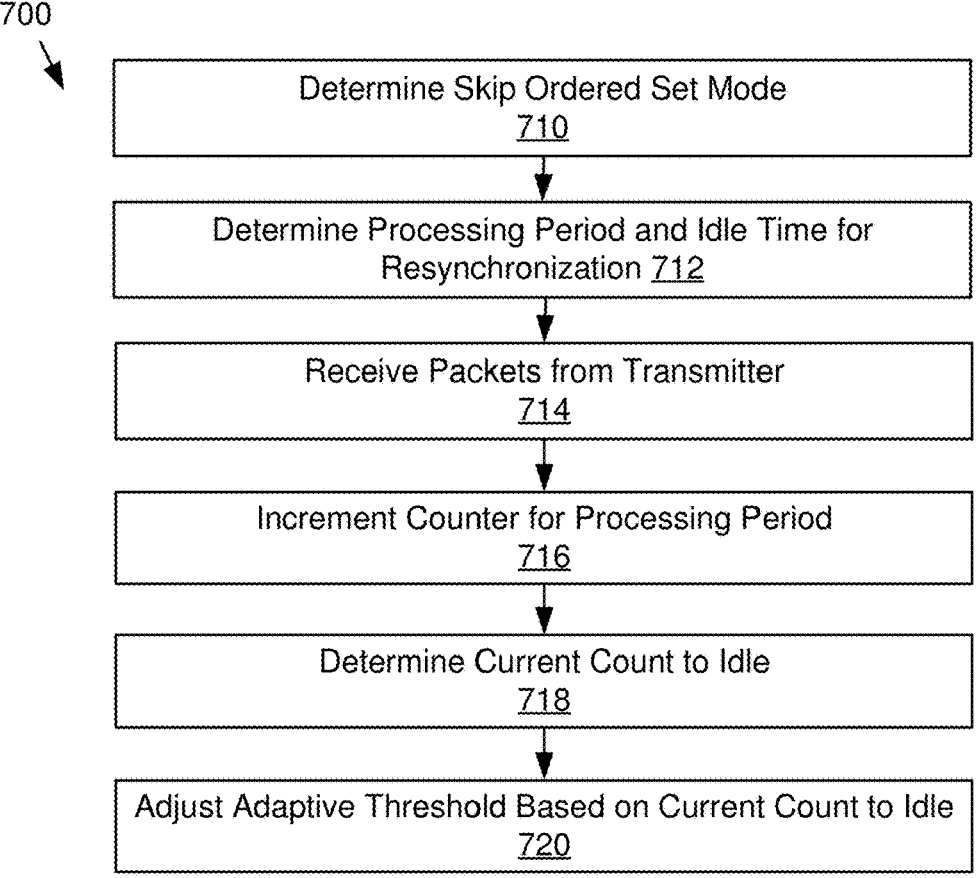

Determine Skip Ordered Set Mode
710

Determine Processing Period and Idle Time for
Resynchronization 712

Receive Packets from Transmitter
714

Increment Counter for Processing Period
716

Determine Current Count to Idle
718

Adjust Adaptive Threshold Based on Current Count to Idle
720

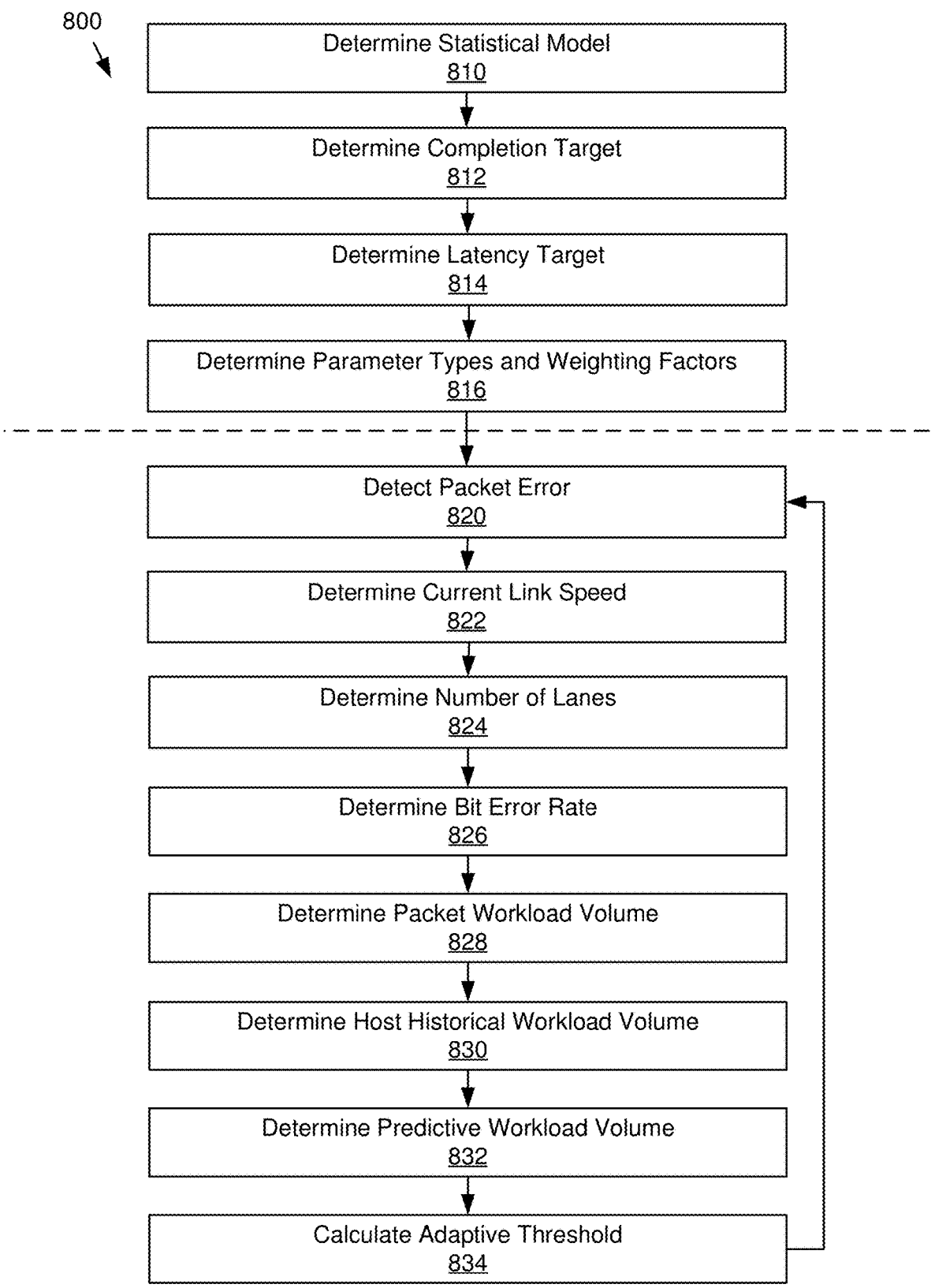

Determine Statistical Model
810

Determine Completion Target
812

Determine Latency Target
814

Determine Parameter Types and Weighting Factors
816

Detect Packet Error
820

Determine Current Link Speed
822

Determine Number of Lanes
824

Determine Bit Error Rate
826

Determine Packet Workload Volume
828

Determine Host Historical Workload Volume
830

Determine Predictive Workload Volume
832

Calculate Adaptive Threshold
834

Figure 8

ADAPTIVE REPLAY OF PACKETS IN A PERIPHERAL INTERFACE LINK

TECHNICAL FIELD

The present disclosure generally relates to data-link layer communication through a peripheral interface and, more particularly, to using adaptive replay to dynamically select among replay modes to handle packet errors.

BACKGROUND

PCIe (Peripheral Component Interconnect Express) is a high-speed serial computer expansion bus standard widely used in computer systems for connecting various components and peripherals, such as data storage devices. As data transfer rates continue to increase, maintaining reliable communication between devices becomes increasingly challenging. PCIe incorporates error detection and correction mechanisms, including packet replay, to ensure data integrity. However, traditional replay methods can sometimes lead to inefficiencies in bandwidth utilization and increased latency, particularly when only a small portion of transmitted data is affected by errors. For example, selective replay of packets may be more efficient than sequential replay of all packets in many cases, but selective replay may be constrained by the size of the replay buffer on the receive side of the data link layer of the PCIe interface. In some operating conditions, proactively selecting between selective and sequential replay may be advantageous. As computing systems demand ever-higher performance and lower latency, there is a growing need for more sophisticated and adaptive approaches to managing packet replay in PCIe communications.

Therefore, there still exists a need for more sophisticated and adaptive approaches to managing data link packet replay in PCIe communications that can improve bandwidth utilization and reduce latency while maintaining data integrity.

SUMMARY

Various aspects for adaptive replay of data link packets in a peripheral interface are described. More particularly, a replay logic circuit dynamically determines an adaptive threshold based on link operating parameters and selects between a selective replay mode and a sequential replay mode by comparing a replay buffer fill level to the adaptive threshold, enabling efficient handling of packet errors while optimizing buffer usage and system performance.

One general aspect includes a device that includes a peripheral interface configured to connect to a host system using a peripheral interface protocol. The peripheral interface protocol includes a data link layer configured to transmit and receive data link packets and the peripheral interface includes a replay buffer memory configured to store received data link packets following a packet in error to support a selective replay mode and a replay logic circuit configured to: determine an error in a data link packet received through the peripheral interface; dynamically determine an adaptive threshold for selecting a replay mode based on a set of link operating parameters; select, based on comparing a fill level of the replay buffer memory to the adaptive threshold, a replay mode selected from the selective replay mode for requesting retransmission of only the data link packet in error and a sequential replay mode for requesting retransmission of the data link packet in error and subsequent data link packets sent after the data link packet in error; and send, based on the selected replay mode, a replay request to the host system.

Implementations may include one or more of the following features. The replay logic circuit may be further configured to, responsive to the selective replay mode: store, in the replay buffer memory, sequential data link packets without errors received after the data link packet in error; sequentially send, responsive to receiving an error-free version of the data link packet in error from the host system, transaction layer content from the error-free version of the data link packet in error and the sequential data link packets without errors in the replay buffer memory; and clear the sequential data link packets without errors from the replay buffer memory. The replay logic circuit may be further configured to, responsive to the sequential replay mode: discard sequential data link packets received after the data link packet in error; and sequentially send, responsive to receiving the error-free version of the data link packet in error and resent sequential data link packets received after the error-free version of the data link packet in error, transaction layer content from the error-free version of the data link packet in error and the resent sequential data link packets. The replay buffer memory may have a buffer size corresponding to a total number of data link packets that can be stored in the replay buffer memory at a time, the fill level may correspond to a current number of data link packets stored in the replay buffer memory for pending selective replay requests, the adaptive threshold may correspond to a maximum fill level that is less than the buffer size of the replay buffer memory, and the replay logic circuit may be further configured to periodically determine the adaptive threshold from a plurality of maximum fill levels based on the set of link operating parameters. The peripheral interface protocol may support a flow control mode configured to vary a memory size and format of the data link packets and the replay logic circuit may be further configured to: determine that the flow control mode is active; determine the fill level of the replay buffer memory based on the memory size and format of the data link packets in the flow control mode; and dynamically determine the adaptive threshold based on the flow control mode. The replay logic circuit may be further configured to, responsive to each detection of a data link packet in error, recalculate the adaptive threshold based on a current set of link operating parameters to dynamically determine the adaptive threshold for that data link packet in error. The replay logic circuit may be further configured to dynamically determine the adaptive threshold by processing the set of link operating parameters through a statistical model comprised of the set of link operating parameters and corresponding weighting factors configured to balance a likelihood of successfully recovering the data link packet in error with data link layer latency. The set of link operating parameters may include at least one link connection parameter selected from: current link speed; number of lanes; and bit error rate for the current link speed and number of lanes. The set of link operating parameters may include at least one link workload parameter selected from: a current data link packet workload volume; a host system historical workload volume; and a predictive workload volume. The peripheral interface protocol may support a skip ordered set mode configured to periodically resynchronize the data link layer by introducing idle time between fixed periods of transaction layer packet processing, the link set of operating parameters may include a counter for the fixed periods of transaction layer packet processing; and responsive to the skip ordered set mode, dynamically determining the adaptive threshold may include compensation for predicted idle time based on the counter. The device may be a data storage device that includes: a non-volatile storage medium configured to store data for the host system; and a peripheral interface connector configured to connect to a peripheral interface bus for storage communication with the host system using the peripheral interface protocol.

Another general aspect includes a computer-implemented method that includes: receiving, using a peripheral interface protocol, data link packets from a host system through a peripheral interface; determining an error in a data link packet received through the peripheral interface; dynamically determining an adaptive threshold for selecting a replay mode based on a set of link operating parameters; selecting, based on comparing a fill level of a replay buffer memory to the adaptive threshold, a replay mode selected from a selective replay mode for requesting retransmission of only the data link packet in error and a sequential replay mode for requesting retransmission of the data link packet in error and subsequent data link packets sent after the data link packet in error; and sending, based on the selected replay mode, a replay request to the host system.

Implementations may include one or more of the following features. The computer-implemented method may include, responsive to the selective replay mode: storing, in the replay buffer memory, sequential data link packets without errors received after the data link packet in error; sequentially sending, responsive to receiving an error-free version of the data link packet in error from the host system, transaction layer content from the error-free version of the data link packet in error and the sequential data link packets without errors in the replay buffer memory; and clearing the sequential data link packets without errors from the replay buffer memory. The computer-implemented method may include, responsive to the sequential replay mode: discarding sequential data link packets received after the data link packet in error; and sequentially sending, responsive to receiving the error-free version of the data link packet in error and resent sequential data link packets received after the error-free version of the data link packet in error, transaction layer content from the error-free version of the data link packet in error and the resent sequential data link packets. The computer-implemented method may include periodically determining the adaptive threshold from a plurality of maximum fill levels based on the set of link operating parameters, where: the replay buffer memory has a buffer size corresponding to a total number of data link packets that can be stored in the replay buffer memory at a time; the fill level corresponds to a current number of data link packets stored in the replay buffer memory for pending selective replay requests; and the adaptive threshold corresponds to a maximum fill level that is less than the buffer size of the replay buffer memory. The computer-implemented method may include: determining that a flow control mode is active, where the peripheral interface protocol supports the flow control mode configured to vary a memory size and format of the data link packets; determining the fill level of the replay buffer memory based on the memory size and format of the data link packets in the flow control mode; and dynamically determining the adaptive threshold based on the flow control mode. The computer-implemented method may include, responsive to each detection of a data link packet in error, recalculating the adaptive threshold based on a current set of link operating parameters to dynamically determine the adaptive threshold for that data link packet in error. The computer-implemented method may include processing the set of link operating parameters through a statistical model comprised of the set of link operating parameters and corresponding weighting factors configured to balance a likelihood of successfully recovering the data link packet in error with data link layer latency. The set of link operating parameters may include at least one link connection parameter selected from: current link speed; number of lanes; and bit error rate for the current link speed and number of lanes. The set of link operating parameters may include at least one link workload parameter selected from: a current data link packet workload volume; a host system historical workload volume; and a predictive workload volume. The peripheral interface protocol may support a skip ordered set mode configured to periodically resynchronize a data link layer by introducing idle time between fixed periods of transaction layer packet processing; the link set of operating parameters may include a counter for the fixed periods of transaction layer packet processing; and responsive to the skip ordered set mode, dynamically determining the adaptive threshold includes compensation for predicted idle time based on the counter.

Still another general aspect includes a peripheral interface circuit that includes: a data link layer configured to receive data link packets from a host system; a replay buffer memory configured to store received data link packets following a packet in error to support a selective replay mode; means for determining an error in a data link packet received from the host system; means for dynamically determining an adaptive threshold for selecting a replay mode based on a set of link operating parameters; means for selecting, based on comparing a fill level of the replay buffer memory to the adaptive threshold, a replay mode selected from the selective replay mode for requesting retransmission of only the data link packet in error and a sequential replay mode for requesting retransmission of the data link packet in error and subsequent data link packets sent after the data link packet in error; and means for sending, based on the selected replay mode, a replay request to the host system.

The various embodiments advantageously apply the teachings of peripheral bus interfaces for computer peripherals to improve the functionality of computer systems including those peripheral devices. The various embodiments include operations to overcome or at least reduce the issues previously encountered in computer systems using peripheral interfaces and, accordingly, are more reliable and/or efficient than other computing systems. That is, the various embodiments disclosed herein include hardware and/or software with functionality to improve link latency and reliability for peripheral interfaces, such as by using an adaptive threshold based on link operating parameters to select between selective and sequential replay modes. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

BRIEF DESCRIPTION OF THE DRAWINGS

FIG. 3 schematically illustrates a data link layer receive circuit for managing data packet replay in a peripheral interface of a computing device.

FIG. 6 is a flowchart of an example method for determining parameters related to a replay buffer in a peripheral interface of a computing device based on flow control mode.

FIG. 7 is a flowchart of an example method for adjusting an adaptive threshold for packet replay modes based on a skip order set mode.

FIG. 8 is a flowchart of an example method for determining an adaptive threshold for packet replay in a peripheral interface of a computing device.

DETAILED DESCRIPTION

The present disclosure relates to adaptive replay systems for peripheral interfaces. In some examples, an adaptive replay system may dynamically select between selective and sequential replay modes for handling packet errors in data link layer communications. The adaptive replay system may utilize a set of link operating parameters to determine an adaptive threshold for selecting the appropriate replay mode.

The peripheral interface may connect a device to a host system using a peripheral interface protocol. The peripheral interface protocol may include a data link layer configured to transmit and receive data link packets. A replay buffer memory may be implemented to store received data link packets following a packet in error, supporting a selective replay mode.

A replay logic circuit may be configured to determine an error in a data link packet received through the peripheral interface. The replay logic circuit may dynamically determine an adaptive threshold for selecting a replay mode based on a set of link operating parameters. For example, the link operating parameters may include current link speed, number of lanes, bit error rate, current workload, and historical behavior of the host system.

The replay logic circuit may select a replay mode by comparing a fill level of the replay buffer memory to the adaptive threshold. The replay modes may include a selective replay mode for requesting retransmission of only the data link packet in error, and a sequential replay mode for requesting retransmission of the data link packet in error and subsequent data link packets sent after the data link packet in error.

The adaptive replay system may periodically recalculate the adaptive threshold based on current link operating parameters. This dynamic approach may allow the system to adapt to varying conditions and error patterns, potentially improving overall system performance and reliability. The peripheral interface protocol may support additional features that may influence the adaptive threshold determination. For example, a flow control mode may be supported, which may vary the memory size and format of the data link packets, and/or a skip ordered set mode may be supported, which may define processing periods and scheduled idle periods to support resynchronization of the data link layer. The replay logic may adjust its calculations based on the active flow control mode and/or skip ordered set mode.

The adaptive replay system may be implemented in various devices that utilize peripheral interfaces. For example, the system may be incorporated into data storage devices, network interface cards, or other computer peripherals that communicate with a host system using a peripheral interface protocol, such as PCIe.

Figure 1:
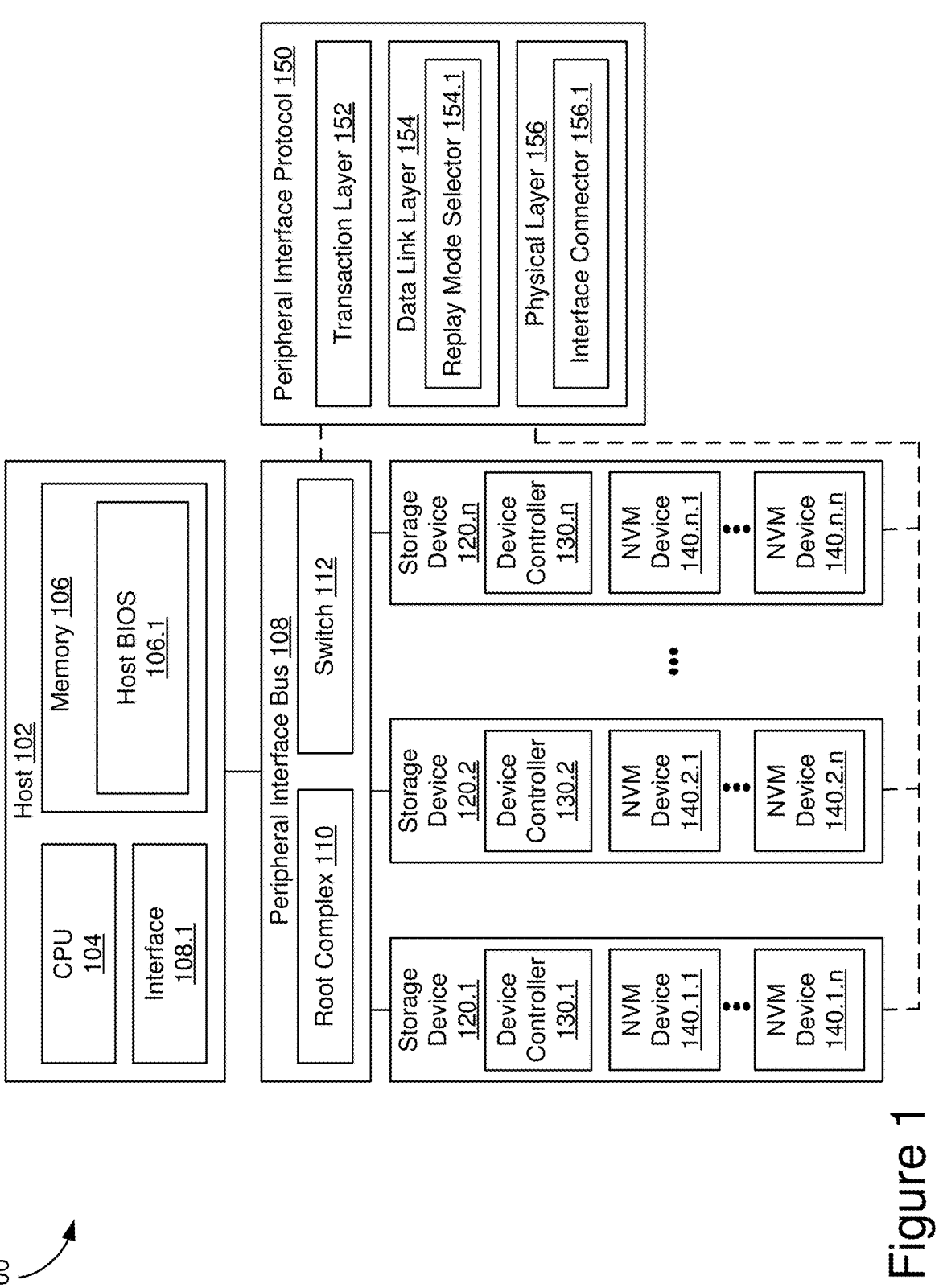
FIG. 1 schematically illustrates a system for data storage and communication using a peripheral interface with an adaptive replay mode selector in the data link layer.

FIG. 1 shows an embodiment of an example data storage system 100 with multiple data storage devices 120 interconnected by peripheral interface bus 108. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, disk drives, or drives). In some embodiments, storage devices 120 may be configured in a server or storage array blade or similar storage unit for use in data center storage racks or chassis. Storage devices 120 may interface with one or more hosts 102 and provide data storage and retrieval capabilities for or through those host systems. In some embodiments, storage devices 120 may be configured in a storage hierarchy that includes storage nodes, storage controllers, and/or other intermediate components between storage devices 120 and host 102. For example, each storage device may include a peripheral interface circuit and corresponding peripheral interface connector for connecting to peripheral interface bus 108 and one or more intermediate systems or components may act as a host system and/or root complex for peripheral interface bus communication.

In the embodiment shown, a number of storage devices 120 are attached to a common peripheral interface bus 108 for host communication. For example, storage devices 120 may include a number of drives arranged in a storage array, such as storage devices sharing a common rack, unit, or blade in a data center or the solid state drives (SSDs) in an all flash array. In some embodiments, storage devices 120 may share a backplane network, network switch(es), and/or other hardware and software components accessed through peripheral interface bus 108. For example, storage devices 120 may connect to peripheral interface bus 108 through a plurality of physical port connections that define physical, link, and other logical channels for establishing communication with the different components and subcomponents for establishing a communication channel to host 102. In some embodiments, peripheral interface bus 108 may be configured as a storage interface bus and provide the primary host interface for storage device management and host data transfer.

In some embodiments, storage devices 120 may be configured for peer communication among storage devices 120 through peripheral interface bus 108, with or without the assistance of host 102. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth storage interface and storage interface bus 108. In these cases, storage devices 120 may be configured to act as both initiator and end point devices for peripheral interface communications, allowing one storage device to act as a host system for initiating communication with another storage device through peripheral interface bus 108.

In some embodiments, data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with peripheral interface bus 108.

In some embodiments, a respective data storage device 120 may include a single medium device while in other embodiments the respective data storage device 120 includes a plurality of media devices to provide a non-volatile storage medium for storing host data. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page,
erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

Host system 102, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host system 102 is sometimes called a host, client, or client system. In some embodiments, host system 102 is a server system, such as a server system in a data center, or a storage system, such as a storage array in a data center. In some embodiments, the one or more host systems 102 are one or more host devices distinct from a storage controller or storage node housing the plurality of storage devices 120. The one or more host systems 102 may be configured to store and access data in the plurality of storage devices 120.

Host system 102 may include one or more central processing units (CPUs) 104 for executing compute operations or instructions for accessing storage devices 120 through peripheral interface bus 108. In some embodiments, CPU 104 may include a host processor and be associated with an operating memory 106 for executing both storage operations and a storage interface protocol compatible with peripheral interface bus 108 and storage devices 120. In some embodiments, memory 106 may include one or more dynamic random access memory (DRAM) devices for use by storage devices 120 for command, management parameter, and/or host data storage and transfer. In some embodiments, storage devices 120 may be configured for direct memory access (DMA), such as using remote direct memory access (RDMA) protocols, over peripheral interface bus 108 to access and use the host memory buffer allocated to that storage device. Memory 106 may also include an operating system (not shown), firmware, and/or software applications for executing various functions of host system 102. In some configurations, memory 106 may include a host basic input output system (BIOS) 106.1 for establishing basic communication among components of host system 102 during boot up. In some embodiments, host BIOS 106.1 may by configured to establishing communication to storage devices 120 through peripheral interface bus 108 during boot up.

In some configurations, peripheral interface bus 108 may be interface with a common bus shared by other components of host system 102, such as CPU 104 and memory 106. In other configurations, host system 102 may include interface ports for connecting to peripheral interface bus 108. For example, host system 102 may include a peripheral bus interface 108.1 for physically connecting to the peripheral interface bus 108. Host 102, peripheral interface bus 108, and/or a storage interface unit may include a root complex 110 for the peripheral interface protocol that manages connection and communication over peripheral interface bus 108 using peripheral interface switch 112. For example, root complex 110 may be configured as a PCIe root complex that connects the CPU and memory subsystems to the PCIe switch fabric composed of various endpoints, which may include storage devices 120, host system 102, and other devices connected to peripheral interface bus 108. In some embodiments, host system 102 may provide the processor and memory resources to support root complex 110. From the perspective of storage devices 120, peripheral interface bus 108 may be referred to as a host interface bus and provides a host data path between storage devices 120 and host 102, as well as among other endpoints that may act as host systems for initiating communication over peripheral interface bus 108.

System 100 may include a peripheral interface protocol 150 configured to connect peripheral interface bus 108 and the various endpoints connected to peripheral interface bus 108, such as host 102 and storage devices 120, for storage communication. Peripheral interface protocol 150 may be based on a transaction layer 152, a data link layer 154, and a physical layer 156. Transaction layer 152 may be responsible for handling higher-level protocol operations, such as read and write requests, and may manage the flow of transaction layer packets (TLPs) between the host 102 and the storage devices 120.1, 120.2, 120.n. Transaction layer 152 may handle TLP formation, routing, ordering, and flow control. Data link layer 154 may be responsible for reliable data transfer for transaction layer 152 through physical layer 156. For example, data link layer 154 may allocate the contents of transaction layer packets to data link packets for transmission through physical layer 156. Data link layer 154 may incorporate a replay mode selector 154.1, which may be configured to dynamically select between different replay modes for handling packet errors. Data link layer 154 may manage data link packets (DLLPs) and implement error detection and correction mechanisms for assuring accurate transfer of transaction layer data between transmit and receive sides of data link layer 154 of corresponding end points. Physical layer 156 may be responsible for the actual transmission and reception of data over the physical medium of peripheral interface bus 108. In some cases, physical layer 156 may include peripheral interface connectors 156.1 for each endpoint connecting to peripheral interface bus 108 and the conductors and switches therein. Physical layer 156 may handle tasks such as signal encoding, timing, and electrical specifications for data transmission.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
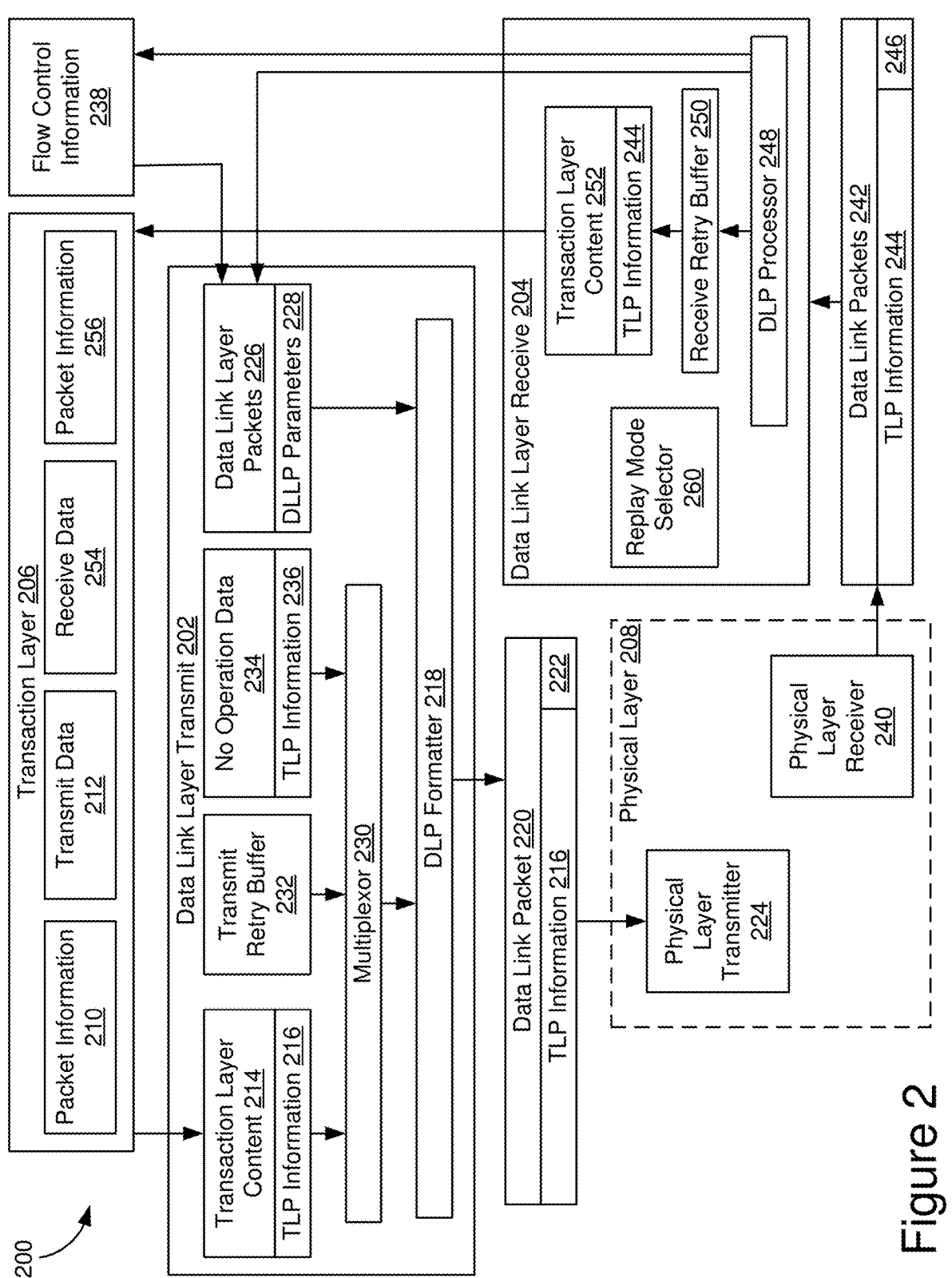
FIG. 2 schematically illustrates a system for data communication focusing on the transmit and receive components of the data link layer supporting adaptive replay mode selection.

Referring to FIG. 2, a block diagram of a system 200 for data communication is illustrated, particularly focusing on the data link layer of a peripheral interface protocol. System 200 may include a transaction layer 206, a data link layer transmit circuit 202, a data link layer receive circuit 204, and a physical layer 208. Devices implementing the peripheral interface protocol, such as PCIe endpoints, may include both transmit and receive components, though any given transaction would be between the transmit portion of one device and the receive portion of another device. Additionally, more complex peripheral interface bus connection may include intervening components, such as switches and corresponding root complexes, for routing packets among multiple endpoints.

Data link layer transmit circuit 202 may process transaction layer content 214 including transaction layer packet (TLP) information 216 received from the transaction layer 206. For example, transaction layer 206 may determine a transaction layer packet for a destination end point and generate corresponding transmit data 212 (TLP packet payload) and packet information 210 (TLP packet header and parameters for TLP packet handling). In some configurations, the peripheral interface protocol may implement a flow control mode, such as FLIT in PCIe. For example, transaction layer content 214 may be formatted as 236 bytes of TLP information 216. Note that data link packets may not have a one-to-one mapping with transaction layer packets and, depending on the relative sizes and consistency of transaction layer packets versus data link packets, more or less than one transaction layer packet may fit in a data link packet. The data link layer may be based on sending sequential data link packets for transaction layer content 214 across physical layer 208 and receiving and reassembling the sequential data link packets at data link layer receive 204 to return corresponding transaction layer content 252 to transaction layer 206 at the receiving device. Transaction layer content 214 may then be processed through data link packet (DLP) formatter 218 to wrap TLP information 216 for transmission according to link layer protocols. For example, DLP formatter 218 may add a DLP header and error checking data to TLP information 216, resulting in data link packet 220. In some configurations, data link packet 220 may include an additional 6 bytes of DLP parameters 222, such as a 2 byte DLP header and 4 byte cyclic redundancy check code (CRC) for a 242 byte DLP or FLIT packet. DLPs 220 are passed to physical layer transmitter 224 to be sent to the destination endpoint over the peripheral interface bus (through whatever switches and root complex may be necessary to get there).

In some protocols, the data link layer may generate additional packets for maintaining reliable link communication, such as acknowledgements and replay requests, as well as flow control and power management messages. These administrative packets for the data link layer may be referred to as data link layer packets (DLLPs) 226. DLLPs 226 may include DLLP parameter data 228, such as message type and information. These DLLPs 226 may also receive DLP parameters 222 (headers and CRC) from DLP formatter 218 before being sent through physical layer transmitter 224. DLLPs 226 that include flow control information may receive that flow control information 238 from a corresponding data link layer receive 204, which may include the receiver at the destination endpoint and/or an intermediary receiver, such as a switch.

In some configurations, data link layer transmit circuit 202 may include a transmit replay or retry buffer 232 for storing data that may need retransmission. The transmit retry buffer 232 may be configured to store a variable number of transaction layer packets for replay in response to replay requests from data link layer receiver circuit 204, depending on the current operating conditions and protocol settings. In some configurations, transmit retry buffer 232 may be sized and managed to store all transaction layer packet information 216 for TLPs that have been sent but not been acknowledged through corresponding DLLPs. Data link layer transmit circuit 202 may use a multiplexor 230 with path selection logic to select between new TLPs received from transaction layer 206 and replay of TLPs from transmit retry buffer 232. For example, multiplexor 230 may select replay packets from transmit retry buffer 232 in a first-in-first-out (FIFO) selection when a replay request is pending to assist clearing older TLPs from transmit replay buffer 232. In some configurations, the storage interface protocol may also support no operation (NOP) data packets from transaction layer 206 as no operation data content 234 and corresponding TLP information 236. These TLPs may be handled similarly to regular TLPs but given different priority through multiplexor 230. In some instances, NOP data packets may be sent when no other packets are available to be sent to assist in maintaining the link connection and operating parameters.

On the receiving side, data link layer receive circuit 204 may process incoming data link packets 242 received through physical layer receiver 240 from the transmitter of another device, such as a host system or another endpoint. Data link packets 242 may include TLP information 244 and DLP parameters 246 corresponding to TLP information 216 and DLP parameters 222 sent by the transmitting side and subject to any transmission induced errors. DLP processor 248 may parse DLPs 242 and use DLP parameters 246 for packet identification and error detection. For example, the DLP header may identify the DLP packet and its contents and the CRC may be used to determine whether one or more errors are present in the data link packet. Data link packets that do not contain errors may have the DLP parameters removed and be stored to receive replay or retry buffer 250. For example, TLP or FLIT data corresponding to the original 236 bytes in transaction layer content 214 and TLP information 216 may be stored as a corresponding DLP unit in receive retry buffer 250. Data link packets in error may generate a replay request to be sent in a DLLP back to the transmitter. Replay mode selector 260 may dynamically and adaptively select whether a selective or sequential replay mode is used for the replay request, as will be further described with regard to FIG. 3. Data link packets in error may be discarded and the handling of prior and/or subsequent sequential packets related to the same TLP may be determined by the replay mode selected.

As error-free packets are received and aggregated in receive retry buffer 250. transaction layer content 252 corresponding to TLP information 244 may be reassembled into TLPs and returned to transaction layer 206 as receive data 254 (transaction packet payload) and packet information (transaction packet parameters) for further processing. When a TLP is complete and returned to transaction layer 206, an acknowledgement for that TLP may be sent to the transmitter using a DLLP and allow both data link transmit circuit 202 and data link layer receive circuit 204 to clear the corresponding transaction layer content from their respective transmit retry buffer 232 and receive retry buffer 250. DLP processor 248 may also update flow control information 238 and send corresponding flow control DLLPs to the transmitter.

FIG. 3 schematically shows selected modules of a data link layer receive circuit 300 configured for dynamically adjusting an adaptive threshold for selecting between replay modes. For example, data link layer receive circuit 300 may embody a portion of the data link layer functions described with regard to FIGS. 1 and 2 for a peripheral interface, such as a PCIe interface for a data storage device to communicate with a host system. The endpoint device including receive circuit 300 may include other elements from FIGS. 1 and 2 to support the broader functions for transmitting, receiving, and managing flow control and other features of the peripheral interface and peripheral interface protocol it implements. For example, receive circuit 300 may also include components such as an interface to a physical layer receiver, a DLP processor, TLP logic for reassembling TLP packets from error-free data link packets in receive replay buffer 350 or another receive buffer, flow control logic, and connections to transmit circuit components, such as a DLLP generator for sending replay requests and acknowledgements.

Receive circuit 300 may include a bus 310 interconnecting at least one processor 312, at least one memory 314, and other components of receive circuit 300. Bus 310 may include one or more conductors that permit communication among the components of receive circuit 300 and/or other components of the peripheral interface. Processor 312 may include any type of processor or microprocessor that interprets and executes instructions or operations and may include multiple processors or processor cores configured to operate alone or in combination. Memory 314 may include a random access memory (RAM) or another type of dynamic storage device that stores information and instructions for execution by processor 312 and/or a read only memory (ROM) or another type of static storage device that stores static information and instructions for use by processor 312. Memory 314 may include one or more memory devices and may include memory devices of different types and configurations. In some configurations, some or all of the other components in receive circuit 300 may be instantiated in memory 314 for execution by processor 312. For example, parameter register 360 and replay buffer 350 may be embodied in data structures allocated within memory 314 and replay logic 320 and data link state machine 380 may be instantiated by a set of instructions and data structures in memory 314 for execution by processor 312 to carry out the described functions. In some configurations, one or more components may be instantiated in a hardware circuit comprising its own logic and memory circuits for executing the described functions and processor 312 and memory 314 may provide coordination and management of functions executed by those hardware circuits through bus 310.

Receive circuit 300 may include a replay logic circuit 320 comprised of logic for handling errors detected in received data link packets, managing the capacity of replay buffer 350, and dynamically selecting between replay modes in response to detected packet errors. Replay logic circuit 320 may include an error detector 322 for identifying errors in received data packets. For example, error detector 322 may extract the CRC values from each DLP and perform a CRC check on the received DLP to determine whether transmission-induced errors are present in the DLP. Error detector 322 may include CRC processing logic based on the payload size (FLIT data) and the CRC code added by the transmitter to determine whether a packet includes errors and replay is needed to successfully return the TLP data in that DLP.

Receive circuit 300 may include a replay mode selector 324 within replay logic circuit 320 configured to determine whether to use sequential replay mode 326 or selective replay mode 328 based on various factors. In some configurations, receive circuits may include a static threshold for selecting between sequential replay mode 326 and selective replay mode 328. For example, receive circuit 300 may default to selective replay mode 328 until a fill level of replay buffer 350 meets a static threshold for triggering sequential replay mode 326. The use of a static threshold may allow the receiver to take advantage of both modes, but does not optimize their use due to the dynamic nature of data link connections and varying workloads of the peripheral interface. Therefore, replay mode selector 324 may be configured with a dynamic model for determining an adaptive threshold that adjusts periodically based on a set of link operating parameters. For example, statistic engine 330 may implement one or more statistical models for varying an adaptive threshold in response to changing link operating conditions and current and/or predicted workloads. In some configurations, statistic engine 330 may calculate a new adaptive threshold each time a packet in error is detected by error detector 322. Replay logic circuit 320 may recalculate adaptive threshold 330.1 based on a current set of link operating parameters to dynamically determine the adaptive threshold for each data link packet in error. For example, whenever error detector 322 identifies a packet error, the statistic engine 330 may analyze the current link speed 364, number of lanes 366, bit error rate 368, and other relevant parameters to recalculate an appropriate adaptive threshold 330.1 for that specific error instance. In other configurations, threshold adaptation may be triggered based on a periodic schedule, such as time, number of packets, skip ordered set (SKPOS) resynchronization, or another operating period. Other trigger conditions are also possible, such as based on bit error rate (BER) thresholds, link speed change thresholds, etc.

Sequential replay mode 326 may include a conventional link replay mode configured to restart the sequence of DLPs for the current and future TLPs without storing the TLP data from error free DLPs in the sequence in replay buffer 350. This mode may be used when replay buffer 350 is full or otherwise unavailable and may be selectively used to allow prior packet errors that have already been requested using selective replay mode 328 to clear. Sequential replay mode may be triggered in response to error detection by error detector 322, such as upon receiving a packet that has failed an integrity check using an error detection mechanism, such as CRC. Error notification may be provided to the transmitter by sending a replay request that indicates that the entire TLP should be resent (which may include a plurality of DLPs). Upon receiving the replay request, the transmitting device may locate the TLP in its transmit replay buffer and generate DLPs for resending the TLP sequence. Once the receiving device receives the packet in error (and the other resent DLPs for completing the TLP), the TLP may be reassembled and returned to the transaction layer while an acknowledgements is sent by the receiver to the transmitter.

Selective replay mode 328 may include selective replay of only the DLP in error to avoid the resending of other DLPs in the TLP sequence. Selective replay mode may be based on storing error free DLPs in replay buffer 350 to enable selection and rearrangement of DLPs to complete TLPs. Selective replay mode 328 may be initiated based on error detector 322 and selection by replay mode selector 324. The replay request sent to the transmitter may indicate the selective replay mode and identify the DLP packet in error. The transmitting device retransmits only the requested packet. Receive circuit 300 continues to receive and process good packets received after the packet in error in the sequence of DLPs (and corresponding sequence of TLPs). Selective replay mode 328 uses replay buffer 350 as a reordering buffer to store good packets until the packet in error is retransmitted by the transmitter and received without error. The receiving device acknowledges the retransmitted packet and/or the resulting completion of the TLP that is passed to the transaction layer.

Statistic engine 330 within replay logic circuit 320 may be configured with one or more statistical models for determining an adaptive threshold 330.1. Adaptive threshold 330.1 may include a threshold value that, when met, triggers a change in replay mode from selective replay mode 328 to sequential replay mode 326 and may trigger a return to the selective replay mode when the threshold value is no longer met. For example, adaptive threshold 330.1 may correspond to a fill level of replay buffer 350 and, more specifically, a maximum fill level at or above which sequential replay mode is selected to reduce the pressure on replay buffer 350. Adaptive threshold 330.1 may vary among a range of maximum fill level values that are less than the total capacity of replay buffer 350. Adaptive threshold 330.1 may correspond to a maximum fill level that is less than the buffer size of replay buffer memory 350. For instance, for a given operating period, adaptive threshold 330.1 may be set to 80% of the total buffer size 362 and then adapt to allow for a variable amount of buffer headroom as link operating parameters change. In some configurations, fill levels and adaptive threshold 330.1 may be incremented in steps corresponding to the packet sizes of error-free packets being held in replay buffer 350. For example, FLIT size may be used and the number of packets may be used to express capacity, fill level, and/or adaptive threshold 330.1.

The statistical models used by statistic engine 330 may be based on a set of link operating parameters 330.2. For example, statistic engine 330 may be configured for a set of link operating parameters that represent the link state and workload and may be related to one another to determine that the threshold should be adapted to changing conditions. In some configurations, statistic engine 330 may determine, request, or access operating parameter values for operating parameters 330.2 from parameter register 360. Parameter register 360 may include a combination of link connection parameters, such as current link speed 364, number of lanes 366, and bit error rate 368, and link workload parameters, such as current workload 370 and host workload history 372. In a simple statistical model, the selected operating parameters may each be included as a term in the model and each term may include related operators and weighting factors 330.3 to represent the relationships and tradeoffs among the different parameters. In some configurations, statistic engine 330 may be configured to balance a completion target 330.4 to determine a likelihood that the packet in error (and/or the TLP or TLP sequence it contributes to) will be successfully replayed and received without error and a latency target 330.5 to determine changes in data link layer latency based on a change in replay mode. In some configurations, completion target 330.4 may be based on a completion risk threshold, such as 90% likelihood of recovering the packet in error in a next attempt, and latency target 330.5 may be based on an allowable latency change threshold, such as a 5% increase in link latency. FLIT compensation 330.6 may include a factor in the statistical model or logic in statistic engine 330 that responds to the enablement of a flow control mode and attendant changes in the size and format of packets and their impact on replay buffer 350 and reordering or completion logic for the corresponding TLP. SKPOS compensation 330.7 may include a factor in the statistical model or logic in statistic engine 330 that responds to enablement of a skip ordered set mode and related processing periods and idle time that provide predictable interruptions in DLP packet processing and support catch up on error backlogs. Statistic engine 330 may be configured to compensate for any number or combination of operating parameters and/or operating modes that impact link operations.

Replay logic circuit 320 may include a replay request interface 332 for initiating packet retransmissions through a replay request to the transmitting device, such as initiating a DLLP message identifying a packet in error and the replay mode requested. Replay logic circuit 320 may include reordering logic 334 for responding to error free packets stored in replay buffer 350 and/or received in response to replay requests to reassemble DLP and TLP sequences for returning completed TLPs to the transaction layer responsive to an error free version of a packet in error that was the subject of a replay request. Replay logic circuit 320 may include an acknowledgement interface 336 for confirming successful transmissions, such as initiating a DLLP message indicating that a DLP packet is received without error and/or a TLP is completed without error. Replay logic circuit 320 may include a buffer monitor 338 for tracking the status of the replay buffer 350 and, more specifically, determining a current fill level based on the error-free packets stored in replay buffer 350 awaiting completion of their sequence and return of the corresponding TLPs to the transaction layer. The replay logic circuit 320 may be configured to select a replay mode based on comparing a fill level of the replay buffer memory 350 to the adaptive threshold. For instance, buffer monitor 338 may track the current fill level of replay buffer 350, and replay mode selector 324 may compare this fill level to the adaptive threshold 330.1 to determine whether to use sequential replay mode 326 or selective replay mode 328.

Replay buffer memory 350 may include one or more memory devices configured to store data link packets 352.1, 352.2, 352.3, up to 352.n. Replay buffer memory 350 may be configured as a FIFO buffer with a total capacity based on the allocated device memory size and the packet size of packets 352. In some configurations, replay buffer 350 may be indexed to allow reordering of packets based on their intended sequential order (as determined at the transmitter) and represented in the header parameters of the DLPs and/or TLP mapping data. Replay buffer memory 350 may be configured to store received data link layer packets without errors following a packet in error to support a selective replay mode and reassembly of the sequential packets once the corrected packet in error is received. In some configurations, the replay buffer memory 350 may have a buffer size corresponding to a total number of data link packets that can be stored in the replay buffer memory 350 at a time. For example, the buffer size 362 stored in parameter register 360 may indicate the maximum capacity of replay buffer memory 350. The fill level of replay buffer memory 350 may correspond to a current number of data link packets stored in replay buffer memory 350 for pending selective replay requests. Buffer monitor 338 may track this fill level in real-time as packets are added to and removed from replay buffer memory 350.

Parameter register 360 may include one or more memory devices configured to store various link operating parameters. Example link operating parameters that may be included in parameter register 360 include: replay buffer size 362, current link speed 364, number of lanes 366, BER 368 (for current link speed and number of lanes), current data link packet workload volume 370, host system history 372 (historical workload volume for the specific host system/transmitter), a FLIT mode indicator 374, and a SKPOS counter 376. Some or all of these parameters may be used by replay logic circuit 320 to determine adaptive threshold 330.1 and dynamically select between or among replay modes. For example, statistic engine 330 may use a set of link operating parameters that include link connection parameters selected from link speed 364, lanes 366, and BER 368 to model the link latency and likelihood of errors. In another example, statistic engine 330 may use a set of link operating parameters that include link workload parameters selected from workload 370, host history 372, and/or a predictive workload volume based on the current workload, host history, and a predictive model that extrapolates changes in current workload over a future time period. In some configurations, one or more of the parameter values in parameter register 360 may be determined by a data link state machine 380. For example, data link state machine 380 may monitor link speed 364, lane connections 366, BER 368, current workload, and various modes (including FLIT and SKPOS modes) to maintain link operation at a desired performance level. In some configurations, parameter register 360 may include a set of memory registers associated with data link state machine 380 and/or other functions within or connected to receive circuit 300 that may be updated and accessed to provide current values for each parameter.

In some configurations, replay logic circuit 320 may be configured to determine that a flow control mode is active. For example, the FLIT mode 374 parameter in parameter register 360 may indicate whether a flow control mode such as FLIT (Flow Control Unit) is currently in use. When FLIT mode is active, the replay logic circuit 320 may adjust its calculations and decision-making processes to account for the different packet sizes and formats used in FLIT mode. Statistic engine 330 may employ various compensation mechanisms to fine-tune the adaptive threshold 330.1. For example, FLIT compensation 330.6 may adjust calculations to account for the specific characteristics of FLIT mode when it is active.

Similarly, SKPOS compensation 330.7 may modify the threshold based on the frequency and timing of skip ordered sets as indicated by SKPOS counter 376. Replay mode selector 324 may consider the distance from the SKPOS time window or current packet processing window. In some configurations, SKP OS are periodic markers inserted into the data stream to maintain synchronization between the transmitter and receiver, introducing idle time to allow resynchronization of the data link layer. The parameter register 360 may include SKPOS counter 376 to track the timing and frequency of these SKP OS occurrences. SKPOS counter 376 may provide information about the timing of skip ordered sets, which may influence packet transmission patterns. Replay mode selector 324 may use this information to adjust its replay mode selection strategy. SKPOS compensation 330.7 may use the value from SKPOS counter 376 to adjust the adaptive threshold 330.1 or influence the replay mode selection. For example, if the SKPOS counter 376 indicates that a SKP OS is imminent, the replay logic circuit 320 may adjust its decision-making process to avoid initiating a sequential replay operation that could conflict with the upcoming SKP OS. If a packet error occurs close to an upcoming SKP OS window, replay mode selector 324 may increase adaptive threshold 330.1 and rely on the idle time provided by the SKP OS resynchronization to receive packet retransmissions before a next processing window is initiated, rather than having a sequential replay interrupted.

Figure 4:
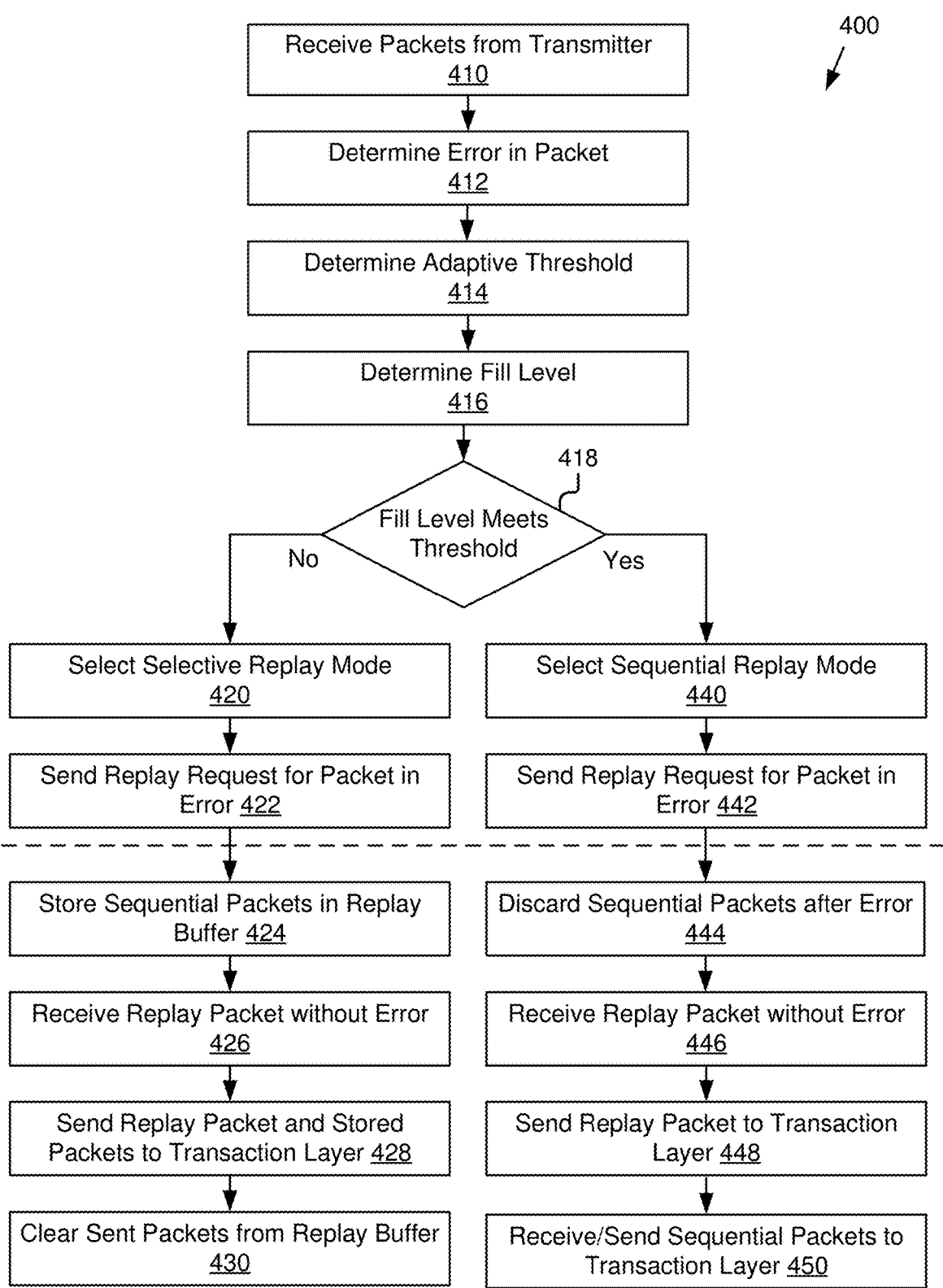
FIG. 4 is a flowchart of an example method of dynamically selecting a replay mode in the data link layer of a receiver of PCIe system.

FIG. 4 illustrates a flowchart for a method 400 of dynamically selecting a replay mode in a PCIe system. The method 400 may be executed by a receive circuit in a data storage device or other peripheral device connected to a host system through a PCIe interface. The method 400 may result in efficient handling of packet errors while optimizing buffer usage and system performance. In general, the method 400 may dynamically select between selective and sequential replay modes based on the fill level of a replay buffer and an adaptive threshold.

At block 410, packets may be received from a transmitter. For example, the receive circuit may accept data link packets from a host system through a PCIe interface.

At block 412, an error in the received packet may be determined. For example, the receive circuit may perform a cyclic redundancy check on the received packet to detect any transmission errors.

At block 414, an adaptive threshold may be determined. For example, the receive circuit may calculate a threshold value based on current link operating parameters such as link speed, number of lanes, and bit error rate.

At block 416, the fill level of a replay buffer may be determined. For example, the receive circuit may check the memory allocation in its replay buffer memory used for storing good packets awaiting the replay of packets in error during selective replay.

At block 418, a decision may be made based on whether the fill level meets the threshold. For example, the receive circuit may compare the current replay buffer fill level to the calculated adaptive threshold.

At block 420, the selective replay mode may be selected if the fill level does not meet the threshold. For example, the receive circuit may choose to use selective replay if sufficient buffer space is available.

At block 422, a replay request may be sent for the packet in error. For example, the receive circuit may transmit a data link layer packet (DLLP) to the host system requesting retransmission of the specific erroneous packet and specifying the selective replay mode.

At block 424, sequential packets may be stored in the replay buffer. For example, the receive circuit may continue to accept and buffer subsequent error-free packets while waiting for the retransmission of the packet in error.

At block 426, the replay packet may be received without error. For example, the receive circuit may accept the retransmitted packet from the host system and verify its integrity to confirm an error-free version.

At block 428, the transaction layer content from the replay packet and stored packets may be sent to the transaction layer. For example, the receive circuit may forward the transaction layer packet or packets corresponding to the corrected packet sequence, including the error-free version of the packet in error, to higher protocol layers for further processing.

At block 430, the sent packets may be cleared from the replay buffer. For example, the receive circuit may remove the successfully processed packets from its buffer to free up space.

At block 440, the sequential replay mode may be selected if the fill level meets the threshold, which may include equaling or exceeding the adaptive threshold. For example, the receive circuit may choose to use sequential replay if buffer space is limited and operating conditions suggest that selective replay is unlikely to be successful or more efficient.

At block 442, a replay request may be sent for the packet in error. For example, the receive circuit may transmit a DLLP to the host system requesting retransmission starting from the erroneous packet.

At block 444, sequential packets after the error may be discarded. For example, the receive circuit may ignore any subsequent packets received after detecting the error.

At block 446, the replay packet may be received without error. For example, the receive circuit may accept the retransmitted packet from the host system and verify its integrity.

At block 448, the transaction layer content from the replay packet may be sent to the transaction layer. For example, the receive circuit may forward the transaction layer packet corresponding to the corrected packet to higher protocol layers for further processing.

At block 450, the transaction layer content from sequential packets may be received and sent to the transaction layer. For example, the receive circuit may accept and forward the remaining retransmitted packet sequence to complete one or more transaction layer packets including and/or following the content from the corrected packet.

Figure 5:
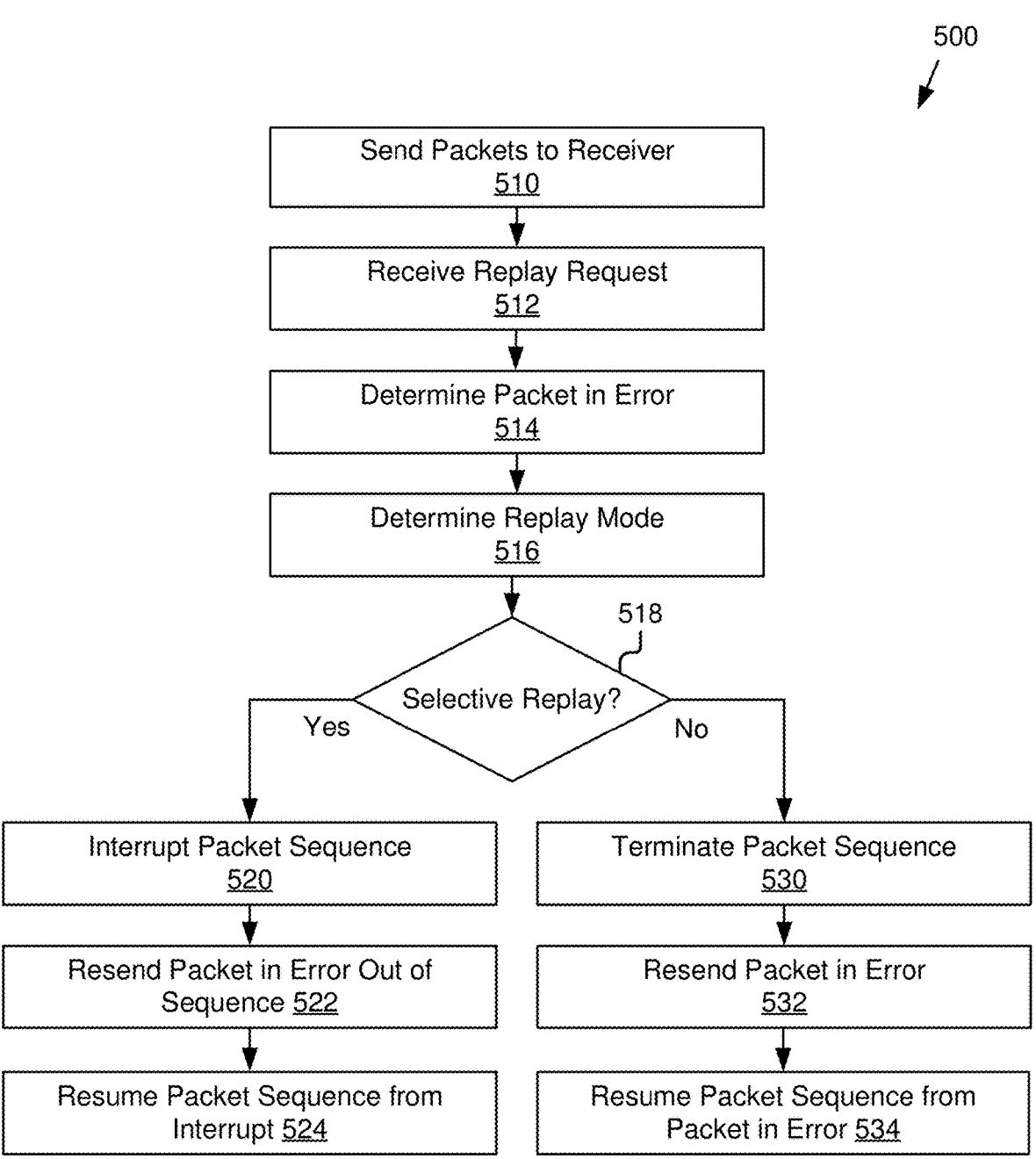
FIG. 5 is a flowchart of an example method for handling packet replay in the data link layer of a transmitter of a PCIe system.

FIG. 5 illustrates a flowchart of a method 500 for handling packet replay in the data link layer of a transmitter of a PCIe system. The method 500 may be executed by a transmit circuit in a data storage device or other peripheral device connected to a host system through a PCIe interface. The method 500 may result in efficient handling of packet errors by dynamically selecting between selective and sequential replay modes. In general, the method 500 may provide a structured approach to error handling in data transmission, allowing for flexibility in choosing the most appropriate replay mode based on the specific circumstances of the error.

At block 510, packets may be sent to a receiver. For example, the transmit circuit may send data link packets to a host system through a PCIe interface.

At block 512, a replay request may be received. For example, the transmit circuit may receive a data link layer packet (DLLP) from the host system indicating that an error has occurred in the transmission of a previously sent packet.

At block 514, the specific packet in error may be determined. For example, the transmit circuit may analyze the replay request to identify which packet needs to be retransmitted based on a data link packet identifier from the header of the packet in error.

At block 516, the replay mode to be used may be determined. For example, the transmit circuit may determine a replay mode parameter value from the replay request that was set by the receiver that detected the error.

At block 518, a decision may be made on whether selective replay should be employed. For example, the transmit circuit may determine whether the value of the replay mode parameter indicates selective replay mode or sequential replay mode.

At block 520, if selective replay is indicated, the packet sequence may be interrupted. For example, the transmit circuit may pause the current transmission sequence to prepare for resending the specific packet in error.

At block 522, the packet in error may be resent out of sequence. For example, the transmit circuit may retrieve the erroneous packet from its transmit buffer and send it immediately, regardless of its original position in the sequence.

At block 524, the packet sequence may be resumed from the point of interruption. For example, after the retransmitted packet, the transmit circuit may return to sending the packets in the ongoing sequence of new packets without repeating the packets that originally followed the retransmitted packet.

At block 530, if selective replay is not indicated, the current packet sequence may be terminated. For example, the transmit circuit may stop the ongoing transmission and prepare to resend all packets from the point of error.

At block 532, the packet in error may be resent. For example, the transmit circuit may retrieve the erroneous packet from its transmit buffer and begin retransmission from this point.

At block 534, the packet sequence may be resumed from the packet that was in error. For example, the transmit circuit may continue sending all subsequent packets in the sequence, effectively retransmitting a portion of the data stream starting with the packet in error and continuing forward.

FIG. 6 illustrates a flowchart of a method 600 for determining parameters related to a replay buffer in a peripheral interface of a computing device based on flow control mode. The method 600 may be executed by a replay logic circuit in a data storage device or other peripheral device connected to a host system through a peripheral interface. The method 600 may result in accurate determination of replay buffer parameters that account for variations in packet size and format due to flow control modes. In general, the method 600 may dynamically adjust replay buffer parameters to optimize error handling and data transmission efficiency in different flow control scenarios.

At block 610, the buffer size of the replay buffer may be determined. For example, the replay logic circuit may access a parameter register to retrieve the total memory capacity allocated for the replay buffer.

At block 612, the flow control mode may be determined. For example, the replay logic circuit may check the current status of the peripheral interface protocol to identify if a specific flow control mode, such as FLIT (Flow Control Unit) mode, is active.

At block 614, the packet size and format, as well as the replay buffer packet capacity, may be determined based on the flow control mode. For example, if FLIT mode is active, the replay logic circuit may calculate the new packet size and format according to FLIT specifications, and then determine how many of these packets can be stored in the replay buffer.

At block 616, the fill level of the replay buffer may be determined based on the packet size and format of the current flow control mode. For example, the replay logic circuit may count the number of packets currently stored in the replay buffer and multiply it by the packet size to calculate the current occupancy of the buffer.

FIG. 7 illustrates a flowchart of a method 700 for adjusting an adaptive threshold for packet replay modes based on a skip ordered set mode. The method 700 may be executed by a replay logic circuit in a data storage device or other peripheral device connected to a host system through a peripheral interface. The method 700 may result in optimized adaptive threshold adjustments that account for periodic resynchronization events in the data link layer. In general, the method 700 may dynamically adjust the adaptive threshold based on processing periods and predicted idle time to improve the efficiency of packet replay decisions.

At block 710, the skip ordered set mode may be determined. For example, the replay logic circuit may check the current status of the peripheral interface protocol to identify if the skip ordered set mode is active.

At block 712, the processing period and idle time for resynchronization may be determined. For example, the replay logic circuit may retrieve the configured values for the fixed periods of transaction layer packet processing and the scheduled or predicted idle time between these periods.

At block 714, packets may be received from the transmitter. For example, the replay logic circuit may accept incoming data link packets from the host system through the peripheral interface.

At block 716, a counter for the processing period may be incremented. For example, the replay logic circuit may update an internal counter that tracks the progress within the current processing period.

At block 718, the current count to idle may be determined. For example, the replay logic circuit may calculate the remaining time or packet count before the next scheduled idle period based on the current counter value and the known processing period duration.

At block 720, the adaptive threshold may be adjusted based on the current count to idle. For example, the replay logic circuit may modify the adaptive threshold for selecting between replay modes, potentially increasing the threshold as the system approaches the idle period to take advantage of the upcoming resynchronization opportunity.

FIG. 8 illustrates a flowchart of a method 800 for determining an adaptive threshold for packet replay in a peripheral interface of a computing device. The method 800 may be executed by a replay logic circuit in a data storage device or other peripheral device connected to a host system through a peripheral interface. The method 800 may result in a dynamically adjusted adaptive threshold that optimizes the selection between replay modes based on current system conditions. In general, the method 800 may analyze various system parameters and historical data to calculate an adaptive threshold that balances efficient error handling with system performance.

At block 810, a statistical model may be determined. For example, the replay logic circuit may select or configure a statistical model that incorporates relevant system parameters and their relationships for threshold calculation.

At block 812, a completion target may be determined. For example, the replay logic circuit may set a target percentage for successful packet transmission completions based on system requirements and historical performance data.

At block 814, a latency target may be determined. For example, the replay logic circuit may establish a maximum acceptable latency for packet retransmissions to maintain overall system responsiveness.

At block 816, parameter types and weighting factors may be determined. For example, the replay logic circuit may identify key system parameters such as link speed and bit error rate, and assign appropriate weighting factors to each based on their relative importance in the statistical model.

At block 820, a packet error may be detected. For example, the replay logic circuit may identify a cyclic redundancy check (CRC) failure in a received data link layer packet.

At block 822, the current link speed may be determined. For example, the replay logic circuit may query the physical layer to obtain the current operating speed of the peripheral interface link.

At block 824, the number of lanes may be determined. For example, the replay logic circuit may check the current link configuration to identify the number of active lanes in the peripheral interface connection.

At block 826, the bit error rate may be determined. For example, the replay logic circuit may calculate or retrieve the current bit error rate based on recent transmission statistics.

At block 828, the packet workload volume may be determined. For example, the replay logic circuit may measure the current rate of packet transmission and reception on the peripheral interface.

At block 830, the host historical workload volume may be determined. For example, the replay logic circuit may access stored data on past workload patterns for the connected host system.

At block 832, a predictive workload volume may be determined. For example, the replay logic circuit may use machine learning algorithms or statistical analysis to forecast expected workload based on current trends and historical data.

At block 834, an adaptive threshold may be calculated based on the collected parameters and factors. For example, the replay logic circuit may input all the determined values into the statistical model to compute a new adaptive threshold for selecting between replay modes specifically for the detected packet in error.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A device comprising a peripheral interface configured to connect to a host system using a peripheral interface protocol, wherein:

the peripheral interface protocol comprises a data link layer configured to transmit and receive data link packets; and the peripheral interface comprises:

a replay buffer memory configured to store received data link packets following a packet in error to support a selective replay mode; and a replay logic circuit configured to:

determine an error in a data link packet received through the peripheral interface;

dynamically determine an adaptive threshold for selecting a replay mode based on a set of link operating parameters;

select, based on comparing a fill level of the replay buffer memory to the adaptive threshold, a replay mode selected from:

the selective replay mode for requesting retransmission of only the data link packet in error; and a sequential replay mode for requesting retransmission of the data link packet in error and subsequent data link packets sent after the data link packet in error; and send, based on the selected replay mode, a replay request to the host system.

2. The device of claim 1, wherein the replay logic circuit is further configured to:

responsive to the selective replay mode:

store, in the replay buffer memory, sequential data link packets without errors received after the data link packet in error;

sequentially send, responsive to receiving an error-free version of the data link packet in error from the host system, transaction layer content from the error-free version of the data link packet in error and the sequential data link packets without errors in the replay buffer memory; and clear the sequential data link packets without errors from the replay buffer memory; and responsive to the sequential replay mode:

discard sequential data link packets received after the data link packet in error; and sequentially send, responsive to receiving the error-free version of the data link packet in error and resent sequential data link packets received after the error-free version of the data link packet in error, transaction layer content from the error-free version of the data link packet in error and the resent sequential data link packets.

3. The device of claim 1, wherein:

the replay buffer memory has a buffer size corresponding to a total number of data link packets that can be stored in the replay buffer memory at a time;

the fill level corresponds to a current number of data link packets stored in the replay buffer memory for pending selective replay requests;

the adaptive threshold corresponds to a maximum fill level that is less than the buffer size of the replay buffer memory; and

the replay logic circuit is further configured to periodically determine the adaptive threshold from a plurality of maximum fill levels based on the set of link operating parameters.

4. The device of claim 3, wherein:

the peripheral interface protocol supports a flow control mode configured to vary a memory size and format of the data link packets; and the replay logic circuit is further configured to:

determine that the flow control mode is active;

determine the fill level of the replay buffer memory based on the memory size and format of the data link packets in the flow control mode; and dynamically determine the adaptive threshold based on the flow control mode.

5. The device of claim 1, wherein the replay logic circuit is further configured to, responsive to each detection of a data link packet in error, recalculate the adaptive threshold based on a current set of link operating parameters to dynamically determine the adaptive threshold for that data link packet in error.

6. The device of claim 1, wherein the replay logic circuit is further configured to dynamically determine the adaptive threshold by processing the set of link operating parameters through a statistical model comprised of the set of link operating parameters and corresponding weighting factors configured to balance a likelihood of successfully recovering the data link packet in error with data link layer latency.

7. The device of claim 1, wherein the set of link operating parameters comprises at least one link connection parameter selected from:

current link speed;

number of lanes; and bit error rate for the current link speed and number of lanes.

8. The device of claim 1, wherein the set of link operating parameters comprises at least one link workload parameter selected from:

a current data link packet workload volume;

a host system historical workload volume; and a predictive workload volume.

9. The device of claim 1, wherein:

the peripheral interface protocol supports a skip ordered set mode configured to periodically resynchronize the data link layer by introducing idle time between fixed periods of transaction layer packet processing;

the link set of operating parameters comprises a counter for the fixed periods of transaction layer packet processing; and responsive to the skip ordered set mode, dynamically determining the adaptive threshold includes compensation for predicted idle time based on the counter.

10. The device of claim 1, wherein the device is a data storage device further comprising:

a non-volatile storage medium configured to store data for the host system; and a peripheral interface connector configured to connect to a peripheral interface bus for storage communication with the host system using the peripheral interface protocol.

11. A computer-implemented method, comprising:

receiving, by a peripheral interface circuit, data link packets from a host system through a peripheral interface using a peripheral interface protocol;

determining, by the peripheral interface circuit, an error in a data link packet received through the peripheral interface;

dynamically determining, by the peripheral interface circuit, an adaptive threshold for selecting a replay mode based on a set of link operating parameters;

selecting, by the peripheral interface circuit and based on comparing a fill level of a replay buffer memory to the adaptive threshold, a replay mode selected from:

a selective replay mode for requesting retransmission of only the data link packet in error; and a sequential replay mode for requesting retransmission of the data link packet in error and subsequent data link packets sent after the data link packet in error; and sending, by the peripheral interface circuit and based on the selected replay mode, a replay request to the host system.

12. The computer-implemented method of claim 11, further comprising:

responsive to the selective replay mode:

storing, by the peripheral interface circuit and in the replay buffer memory, sequential data link packets without errors received after the data link packet in error;

sequentially sending, by the peripheral interface circuit and responsive to receiving an error-free version of the data link packet in error from the host system, transaction layer content from the error-free version of the data link packet in error and the sequential data link packets without errors in the replay buffer memory; and clearing, by the peripheral interface circuit, the sequential data link packets without errors from the replay buffer memory; and responsive to the sequential replay mode:

discarding, by the peripheral interface circuit, sequential data link packets received after the data link packet in error; and sequentially sending, by the peripheral interface circuit and responsive to receiving the error-free version of the data link packet in error and resent sequential data link packets received after the error-free version of the data link packet in error, transaction layer content from the error-free version of the data link packet in error and the resent sequential data link packets.

13. The computer-implemented method of claim 11, further comprising:

periodically determining, by the peripheral interface circuit, the adaptive threshold from a plurality of maximum fill levels based on the set of link operating parameters, wherein:

the replay buffer memory has a buffer size corresponding to a total number of data link packets that can be stored in the replay buffer memory at a time;

the fill level corresponds to a current number of data link packets stored in the replay buffer memory for pending selective replay requests; and the adaptive threshold corresponds to a maximum fill level that is less than the buffer size of the replay buffer memory.

14. The computer-implemented method of claim 13, further comprising:

determining, by the peripheral interface circuit, that a flow control mode is active, wherein the peripheral interface protocol supports the flow control mode configured to vary a memory size and format of the data link packets;

determining, by the peripheral interface circuit, the fill level of the replay buffer memory based on the memory size and format of the data link packets in the flow control mode; and dynamically determining, by the peripheral interface circuit, the adaptive threshold based on the flow control mode.

15. The computer-implemented method of claim 11, further comprising, responsive to each detection of a data link packet in error:

recalculating, by the peripheral interface circuit, the adaptive threshold based on a current set of link operating parameters to dynamically determine the adaptive threshold for that data link packet in error.

16. The computer-implemented method of claim 11, further comprising:

processing, by the peripheral interface circuit, the set of link operating parameters through a statistical model comprised of the set of link operating parameters and corresponding weighting factors configured to balance a likelihood of successfully recovering the data link packet in error with data link layer latency.

17. The computer-implemented method of claim 11, wherein the set of link operating parameters comprises at least one link connection parameter selected from:

current link speed;

number of lanes; and bit error rate for the current link speed and number of lanes.

18. The computer-implemented method of claim 11, wherein the set of link operating parameters comprises at least one link workload parameter selected from:

a current data link packet workload volume;

a host system historical workload volume; and a predictive workload volume.

19. The computer-implemented method of claim 11, wherein:

the peripheral interface protocol supports a skip ordered set mode configured to periodically resynchronize a data link layer by introducing idle time between fixed periods of transaction layer packet processing;

the link set of operating parameters comprises a counter for the fixed periods of transaction layer packet processing; and responsive to the skip ordered set mode, dynamically determining the adaptive threshold includes compensation for predicted idle time based on the counter.

20. A peripheral interface circuit comprising:

at least one processor;

a memory;

a data link layer configured to receive data link packets from a host system;

a replay buffer memory configured to store received data link packets following a packet in error to support a selective replay mode;

means, stored in the memory for execution by the at least one processor, for determining an error in a data link packet received from the host system;

means, stored in the memory for execution by the at least one processor, for dynamically determining an adaptive threshold for selecting a replay mode based on a set of link operating parameters;

means, stored in the memory for execution by the at least one processor, for selecting, based on comparing a fill level of the replay buffer memory to the adaptive threshold, a replay mode selected from:

the selective replay mode for requesting retransmission of only the data link packet in error; and a sequential replay mode for requesting retransmission of the data link packet in error and subsequent data link packets sent after the data link packet in error; and means, stored in the memory for execution by the at least one processor, for sending, based on the selected replay mode, a replay request to the host system.

\* \* \* \* \*